United States Patent [19]

Ishibe et al.

[11] Patent Number: 5,393,852
[45] Date of Patent: Feb. 28, 1995

[54] POLYMERS OF HALOPERFLUORO AND PERFLUORO ETHERS

[75] Inventors: Nobuyuki Ishibe; Charles W. Martin; Tien K. Tran, all of Lake Jackson, Tex.

[73] Assignee: The Dow Chemical Company, Midland, Mich.

[21] Appl. No.: 154,221

[22] Filed: Nov. 17, 1993

Related U.S. Application Data

[62] Division of Ser. No. 904,774, Jun. 25, 1992, Pat. No. 5,264,508.

[51] Int. Cl.$^6$ .............................................. C08F 16/24
[52] U.S. Cl. .................................... 526/247; 526/255
[58] Field of Search ............................... 526/247, 255

[56] References Cited

U.S. PATENT DOCUMENTS

| | | |
|---|---|---|
| 3,132,123 | 5/1964 | Harris, Jr. et al. |
| 3,282,875 | 11/1966 | Connolly et al. |
| 3,310,606 | 3/1967 | Fritz. |
| 3,397,191 | 8/1968 | Beckerbauer. |
| 3,635,926 | 1/1972 | Gresham et al. |
| 3,851,018 | 11/1974 | Kelly. |
| 4,275,225 | 6/1981 | Krespan. |
| 4,335,255 | 6/1982 | Krespan. |
| 4,357,282 | 11/1982 | Anderson et al. |
| 4,499,249 | 2/1985 | Nakagawa et al. |
| 4,526,948 | 7/1985 | Resnick. |
| 4,897,457 | 1/1990 | Nakamura et al. |

FOREIGN PATENT DOCUMENTS 163507 12/1979 Japan.

OTHER PUBLICATIONS

Derwent Abstract No. 82-40393E/20.
Derwent Abstract Mp/ 87-113192/16.
Derwent Abstract No. 91-053484/08.
Derwent Abstract No. 89-204092/28.
Derwent Abstract No. 89-204091/28.
Derwent Abstract No. 89-048097/07.
Derwent Abstract No. 68-27484Q/00.
Derwent Abstract No. 85-177477/29.
Derwent Abstract No. 84-251902/41.
Derwent Abstract No. 83-784423/41.
Derwent Abstract No. 81-95315D/52.
Derwent Abstract No. 81-95313D/52.
Derwent Abstract No. 81-21723D/13.
Derwent Abstract No. 89-210307/29.
Derwent Abstract No. 88-320162/45.
Derwent Abstract No. 91-114424/16.
Derwent Abstract No. 88-079104/12.
Derwent Abstract No. 86-285955/44.
Derwent Abstract No. 85-264878/43.
Derwent Abstract No. 91-061117/09.
Derwent Abstract No. 91-047850/07.
Derwent Abstract No. 80-10263C/06.
Derwent Abstract No. 91-076027/11.
Derwent Abstract No. 91-048104/07.
Derwent Abstract No. 90-118651/16.

*Primary Examiner*—Joseph L. Schofer
*Assistant Examiner*—N. Sarofim

[57] ABSTRACT

Homolymers prepared from diunsaturated mono- or poly- haloperfluoro or perfluoro ethers, and copolymers prepared from two or more of such ethers, or one or more of such ethers and one or more other ethylenically unsaturated monomers; and articles fabricated from such polymers.

36 Claims, No Drawings

POLYMERS OF HALOPERFLUORO AND PERFLUORO ETHERS

CROSS-REFERENCE TO RELATED APPLICATION

This is a divisional of application Ser. No. 07/904,774, Jun. 25, 1992, now U.S. Pat. No. 5,264,508.

FIELD OF THE INVENTION

This invention relates to polymers of haloperfluoro and perfluoro ethers, and to the preparation, fabrication and crosslinking of such polymers.

BACKGROUND OF THE INVENTION

Haloperfluoro and perfluoro mono- and polyethers which are ethylenically unsaturated can be homopolymerized or can be copolymerized with other ethylenically unsaturated monomers to form a melt processible, thermoplastic polymer.

An advantageous feature of such ethers which contain two sites of unsaturation, both a vinyl and an allyl group for example, is that they can be polymerized through one bond to form a melt processible, thermoplastic polymer, while the other bond remains unreacted in a side chain. This unreacted bond is then available to participate in a crosslinking reaction which converts the thermoplastic polymer to a thermoset.

SUMMARY OF THE INVENTION

In one aspect, this invention involves a homopolymer or copolymer of one or more of the ethers described by the formula $CF_2=CF-CF_2-Q-O-CF=CF_2$, where Q is $-G_a-(-O-C_2J_4-)_b-(-O-Z-)_c-$, in which G is a substantially fluorinated $C_3-C_7$ alkyl radical: a is 0 or 1; each J is independently fluorine, chlorine, bromine, or a $C_1-C_4$ substantially fluorinated alkyl radical on which not more than one substituent is chlorine. provided that not more than two J's are non-fluorine halogen atoms; b is 0-6 inclusive; Z is a substantially fluorinated $C_2-C_{10}$ alkyl radical; and c is 0 or 1; provided that sum of a+b+c is greater than 0. In a further aspect, this invention involves a copolymer of one or more of said ethers and one or more other ethylenically unsaturated monomers. This invention also involves a process for crosslinking a polymer as described above, and involves an electrolytic cell containing a membrane prepared from such a polymer.

The polymers of this invention are melt processible, thermoplastic polymers which can be molded, formed or fabricated into finished articles or other goods of virtually any variety, particularly for use in the automotive and electronics industries or for the manufacture of films, such as molded or extruded films used as membranes. The finished articles or other goods can be crosslinked to improve strength, elasticity and tear resistance.

DETAILED DESCRIPTION OF THE INVENTION

The polymers of this invention are either homopolymers or copolymers of a haloperfluoro or perfluoro ether which contains a trifluorovinyl ether group and a perfluoroallyl group which are joined by a radical (i) which contains at least three atoms, and (ii) in which all carbon atoms are substantially fluorinated. A group of carbon atoms is substantially fluorinated when, at fifty percent or more, and preferably at sixty percent or more, of the possible sites at which the carbon atoms in the group could be bonded to hydrogen, the bond is to fluorine rather than hydrogen. Most preferably, the molecule is completely fluorinated, and contains no carbon-hydrogen bonds.

A haloperfluoro or perfluoro ether for use in preparation of the polymers of this invention may be generally described by the formulae $$CF_2=CF-CF_2-Q-O-CF=CF_2, \quad \text{I}$$

where Q is 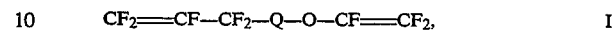 II in which G is a substantially fluorinated $C_3-C_7$ alkyl radical; a is 0 or 1; each J is independently fluorine, chlorine, bromine, or a $C_1-C_4$ substantially fluorinated alkyl radical on which not more than one substituent is chlorine, provided that not more than two J's are non-fluorine halogen atoms; b is 0-6 inclusive; Z is a substantially fluorinated $C_2-C_{10}$, preferably $C_2-C_8$ and more preferably $C_2-C_6$, alkyl radical; and c is 0 or provided that sum of a+b+c is greater than 0. However, it is not required that all of the substituents named above as being represented by G, J, Z, a, b or c be utilized, and any one or more of such substituents, or sub-components thereof, may be omitted as desired in the practice of this invention.

The haloperfluoro and perfluoro ethers described above may be mono- or polyethers, and can be conveniently prepared, in one method, from a 3-haloperfluoropropene oxide. A halide ion may be reacted with a 3-haloperfluoropropene oxide to produce a 2,3-dihaloperfluoroacyl fluoride. This may be accomplished in an inert liquid reaction medium such as the sulfone sulfolane or the glycol ether tetraethylene glycol dimethyl ether.

From a 2,3-dihaloperfluorocarbonyl fluoride, pentafluoro-2-propenyl perfluorovinyl ether (perfluorovinylallyl ether) can be prepared by using a fluoride ion to create an alkoxide ion at the carbonyl 5 carbon of a 2,3-dihaloperfluorocarbonyl fluoride. This reactive intermediate is then coupled to additional 3-haloperfluoropropene oxide by reaction of the alkoxide ion with the epoxide ring to obtain a 2-(2',3'-dihaloperfluoropropoxy)-3-haloperfluoropropionyl fluoride. The 2-(2',3'-dihaloperfluoropropoxy)-3-haloperfluoropropionyl fluoride can then be decarboxylated, using for example sodium carbonate, and can then be dehalogenated, using for example zinc, to obtain perfluorovinylallyl ether (3-oxaperfluorohexa-5-diene). "Perfluoro" as used herein means that all the hydrogen atoms on a molecule, except those whose replacement would affect the nature of the characteristic groups present, have been replaced by fluorine atoms.

If the 2-(2',3'-dihaloperfluoropropoxy)-3-haloperfluoropropionyl fluoride is instead treated further with fluoride ion and is then reacted with additional 3-haloperfluoropropene oxide, a coupling reaction [analogous to that by which the 2-(2',3'-dihaloperfluoropropoxy)-3-haloperfluoropropionyl fluoride itself is prepared] occurs, in which the product is a 2-[2'-(2'',3'-dihaloperfluoropropoxy)-3-haloperfluoropropoxy]-3-haloperfluoropropionyl fluoride. By successive repetition of the steps used to prepare a 2-[2'-(2',3''-dihaloperfluoropropoxy)-3'-haloperfluoropropoxy]-3-haloperfluoropropionyl fluoride, a six-membered, or greater, polyether can be prepared by continued conversion of the terminal carbonyl carbon to an alkoxide ion and addition of it to another equivalent of 3-haloperfluoropropene oxide.

If the 2-[2'-(2'',3'''-dihaloperfluoropropoxy)-3'-haloperfluoropropoxy]-3-haloperfluoropropionyl fluoride, or corresponding higher polyether, is then decarboxylated and dehalogenated, as described above, a 3,6-dioxa-5-halodifluoromethylperfluoronona-1,8-diene, or corresponding higher, diunsaturated polyether, is obtained. A 3,6-dioxa-5-halodifluoromethylperfluoronona-1,8-diene may be represented by the formula

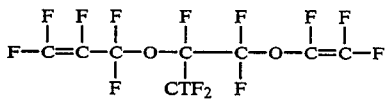

where T is a fluorine, chlorine, bromine or iodine atom. Higher diunsaturated polyethers, prepared by the method described above, may be represented by the formula

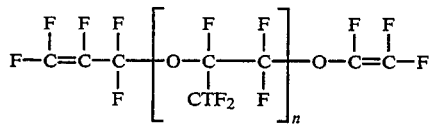

where T is as set forth above, and n is 2 to 6 inclusive.

A 3,6-dioxa-5-halodifluoromethyl-7-haloperfluoronona-1,8-diene is described by Formulae I and II when a and c are 0, b is 1, three J's are fluorine, the fourth J is CTF$_2$, and T is as set forth above. A corresponding polyether of Formula IV is described by Formulae I and II when all values are as described in the preceding sentence except that b is 2 to 6 inclusive.

The preparation of perfluoroallylvinyl ether (pentafluoro-2-propenyl perfluorovinyl etherl), or a 3,6-dioxa-5-halodifluoromethylperfluoronona-1,8-diene, or a corresponding polyether, is further described in application bearing Applicants' Docket No. C-35,810, entitled "Preparation of Haloperfluoro and Perfluoro Ethers", and application bearing Applicants' Docket No. C-35,763, entitled "Preparation of a 2,3-Dihaloperfluorocarbonyl Halide", each being filed on the same date as this application, assigned to the same assignee as this application, and incorporated in its entirety herein.

In another method of preparing a polymerizable ethylenically unsaturated perfluoro ether, an unbranched perfluorovinylallyl ether described by the formula $CF_2=CF-CF_2-O-(CF_2)_{m+2}-O-CF=CF_2$, where m is inclusively an integer oF 0-8, preferably 0-6 and more preferably 0-4, may be prepared by (I) the fluoride ion catalyzed coupling of a 3-haloperfluoropropene oxide to one end of a diacyl Fluoride oF formula $F-C(O)-(CF_2)_m-C(O)-F$, where m is as set forth above, and (II) a similar coupling of the other end to a 3-substituted perfluoropropene in which the 3-substituent is a good leaving group such as perfluoroallyl bromide or perfluoroallyl fluorosulfate. An unbranched perfluorovinylallyl ether, as described in this paragraph, is also described by Formulae I and It when a and b are 0, c is 1, and Z is $(CF_2)_{m+2}$.

A diunsaturated perfluorovinylalkenylether described by the formula $CF_2=CF-CF_2-(CF_2)_p-O-CF=CF_2$, where p is an integer of 3 to 7 inclusive, can be prepared by chlorinating a diene such as $CF_2=CF-CF_2-(CF_2)_{p-2}-CF=CF_2$ to eliminate the double bond from the $CF_2=CF-CF_2-$ group, and then oxidizing the remaining double bond to an epoxide ring. A carbonyl fluoride is then formed from the epoxide ring by a trialkyl amine catalyzed ring-opening reaction, and an alkoxide ion is then formed from the carbonyl by the application of fluoride ion, which allows coupling of the molecule to a 3-haloperfluoropropene oxide with consequent reformation of a carbonyl at that location. Decarboxylation and dehalogenation, as described above, yields a diunsatuarated perfluorovinyl ether. Such an ether is described by Formulae I and II when b and c are 0, a is 1, and G is $(CF_2)_p$.

An ether described by Formulae I and II when c is 0, a and b are 1, G is $CF_2$, 3 J's are F, and the fourth J is $CF_2T$ (where T is as set forth above), can be prepared by the same method set forth above for preparing a 3,6-dioxa-5-halodifluoromethyl-7-haloperfluoronona-1,8-diene except that a 3,4-dihaloperfluoro butanoyl fluoride is used instead of a 2,3-dihaloperfluoropropionyl fluoride.

The polymers of this invention include a homo- or copolymer of one or more of the diunsaturated mono- or poly-, haloperfluoro- or perfluoroethers of Formula I, as described above. Copolymerization can involve two or more of the ethers of Formula I, or one or more of the ethers of Formula I in a monomer mix with one or more other ethylenically unsaturated monomers (those possessing a C=C bond). A copolymer comprising one or more of said ethers and at least one other ethylenically unsaturated monomer is a copolymer which has been prepared by copolymerizing such ether(s) and monomer(s). The copolymer chain thus prepared may exhibit a monomer sequence which is either random, alternate, block and/or grafted.

It is preferred that the polymers of this invention be linear. Linear as used herein means that each diunsaturated ether, as described above, which participates in the formation of a polymer does so by polymerizing to Form the main chain through one double bond while the other double bond remains pendant on a branch chain, and the two double bonds on the same monomer unit do not react with each other to form a cyclic structure.

The polymerization to form the polymers of this invention can be conducted in an aqueous system using a water soluble initiator, for example an inorganic peroxide such as ammonium persulfate or an organic peroxide such as disuccinoyl peroxide. An initiator such as a di(perfluoroacyl)peroxide can also be used in an aqueous polymerization. About 0.0001 moles to about 0.2 moles of initiator is used per mole of the monomer which is present in the greatest quantity. An aqueous polymerization can be carried out at a pH of about 8 or lower, at a temperature of about 50° C. to about 110° C., and a pressure of about 0.01 MPa to about 5 MPa. It may also involve use of a hydrogen-containing chain transfer agent. A fluorocarbon solvent, such as a $C_{1-4}$ chlorfluoroalkane may also be used, but if so, the initiator should not be soluble in such solvent. A dispersing agent such as an ammonium salt of a long-chain perfluorocarbon acid such as ammonium perfluorocaprylate may be used if desired. Aqueous polymerization such as discussed above is described in greater detail in Gresham, U.S. Pat. No. 3,635,926, which is incorporated herein in its entirety.

The polymerization can also be conducted entirely in a perfluorocarbon solvent, for example a perfluoroalkane such as perfluoroheptane, or a perfluorocycloalkane such as perfluorodimethylcyclobutane. A perfluorinated free radical initiator such as a perfluoroperoxide or a nitrogen fluoride is frequently used. About 0.0001 moles to about 0.2 moles of initiator is used per mole of the monomer which is present in the greatest quantity. The process may be run at a temperature of about −50° C. to about 200° C. and a pressure of about 0.01 MPa to about 5 MPa. Polymerization in a perfluorocarbon solvent, such as discussed above, is described in greater detail in Connolly, U.S. Pat. No. 3,282,875, which is incorporated herein in its entirety. The polymerization may also be run in bulk where excess liquid monomer is used as the solvent.

Virtually any ethylenically unsaturated monomer capable of polymerization under the conditions described above can be copolymerized with one or more of the ethers of Formula I. Representative monomers suitable for copolymerization with such ethers can be described as $F-C(R)=C-R_2$, where each R is independently (1) hydrogen;
(2) a halogen such as fluorine, chlorine or bromine;
(3) $-OCH_3$;
(4) $-OC_6F_5$;
(5) $-C(CF_3)_2OH$;
(6) $-R^1-NH-R^1-R^2$, where each $R^1$ is independently $SO_2$, CO or $PO_2$, and $R^2$ is a substantially fluorinated $C_1-C_{10}$ alkyl radical, optionally carrying at one or more sites an ionic charge or a precursor group which can be converted to an ionically charged substituent;
(7) a $C_1-C_{10}$ linear or branched alkyl radical, interruptible with one or more oxygen atoms, each independently optionally containing one or more substituents selected from the group consisting of phenyl, $-F$, $-Cl$, $-Br$, $-I$, $-SO_2F$, $-OCH_3$, $-PO(OCH_3)_2$, $-COF$, $-CO_2H$, $-C(CF_3)_2OH$, $-CO_2CH_3$, $-CN$ and $-R^1-NH-R^1-R^2$, where $R^1$ and $R^2$ are as set forth above;
(8) a phenyl or naphthyl radical, each independently optionally containing one or mope substituents selected from the group consisting of $-F$, $-Cl$, $-Br$, $-I$, $-SO_2F$, $-OCH_3$, $-PO(OCH_3)_2$, $-COF$, $-CO_2H$, $-C(CF_3)_2OH$, $-CO_2CH_3$, $-CN$, $-R^1-NH-R^1-R^2$, where $R^1$ and $R^2$ are as set forth above, and a $C_1-C_6$ linear or branched alkyl radical (independently also optionally containing one or more of the other substituents set forth in this group 8); or
(9) $O-R^3$, $S-R^3$ or $CO_2R^3$, where $R^3$ is a $C_1-C_{10}$ linear or branched alkyl radical, interruptible with either oxygen or keto groups, each independently optionally containing one or more substituents selected from the group consisting of phenyl, $-F$, $-Cl$, $-Br$, $-SO_2F$, $-OCH_3$, $-OC_6F_5$, $-PO(OCH_3)_2$, $-COF$, $-CO_2H$, $-CO_2CH_3$, $-CN$, $-C(CF_3)_2OH$, and $-R^1-NH-R^1-R^2$, where $R^1$ and $R^2$ are as set forth above.

However, it is not required that all of the substituents named above as being represented by R, $R^1$, $R^2$ or $R^3$ be utilized, and any one or more of such substituents, or sub-components thereof, may be omitted as desired in the practice of this invention.

In a preferred embodiment of the polymerizable monomers described by the formula set forth above, each R is independently (1) hydrogen; (2) a halogen such as fluorine, chlorine or bromine; (3) a $C_1-C_{10}$ (and more preferably $C_1-C_6$) linear or branched alkyl radical, interruptible with one or more oxygen atoms, each independently optionally containing one or more substituents selected from the group consisting of $-F$, $-Cl$, $-Br$, $-I$, $-SO_2F$, $-COF$, $-OCH_3$; or (4) $O-R^3$ where $R^3$ is a $C_1-C_{10}$ linear or branched alkyl radical, each independently optionally containing one or more substituents selected from the group consisting of $-F$, $-Cl$, $-Br$, $-I$, $-SO_2F$, $-COF$ and $-OCH_3$. The most preferred monomers are tetrafluoroethylene, chlorotrifluoroethane, vinylidene fluoride ($CF_2CH_2$) and an unsaturated perfluoro ether described by $CF_2=CF-O-(-R^4-O-)_t-R^4$ where each $R^4$ is independently a substantially perfluorinated $C_1-C_8$ alkyl or $C_6-C_{12}$ aryl radical, and t is an integer from 0 to 5 inclusive.

Specific examples of representative monomers which can be copolymerized with an unsaturated haloperfluoro or perfluoro ether as described above are a polyhaloolefin such as a monohaloperfluoroolefin, a vinylidene halide or dihalide, or the perfluoroolefin hexafluoropropylene; or a perhaloethylene such as a monohalotrifluoroethylene, bromotrifluoroethylene, chlorotrifluoroethylene or tetrafluoroethylene; or 2-perfluorovinyloxyethanesulfonyl halide.

In a copolymer of adiunsaturated haloperfluoro or perfluoro ether as described above with monomers such as those named above, the ether can constitute from about 0.]mole percent to about 99 mole percent, preferably from about 0.2 mole percent to about 50 mole percent, more preferably from about 0.3 mole percent to about 25 mole percent. and most preferably from about 0.5 mole percent to about 15 mole percent of the copolymer, with the other ethylenically unsaturated monomers as described above constituting from about 99.9 mole percent to about 1 mole percent, preferably from about 99.8 mole percent to about 50 mole percent, more preferably from about 99.7 mole percent to about 75 mole percent, and most preferably from about 99.5 mole percent to about 85 mole percent of the copolymer.

In several exemplary runs, a 3,6-dioxa-5-halodifluoromethylperfluoronona-1,8-diene is polymerized with other ethylenically unsaturated monomers as follows:

EXAMPLE 1

Tetrafluoroethylene is fed into an emulsified mixture of 3,6-dioxa-5-trifluoromethylperfluoronona-1,8-diene (2.4g), ammonium persulfate (0.6 g), ammonium perfluorooctanoate (1.66 g), sodium dihydrogen phosphate (1.03 g) and disodium monohydrogen phosphate (1.25 g) in deionized water (300 ml). The pressure and temperature of the reaction mixture are kept at 100 psi and 60° C., respectively. After 15 g of tetrafluoroethylene are introduced over 60 minutes, the reaction mixture is cooled to ambient temperature (23.5°–26° C.) and discharged to atmospheric pressure. Diluted hydrochloric acid (50 ml) is added to coagulate the polymer particles, which are collected by filtration. Washing with deionized water and methanol and drying under vacuum gives 12 g of colorless polymer particles. The infrared spectrum of the copolymer does not show the perfluorovinyl C=C double bond absorption at 1,840 cm$^{-1}$, but does show the perfluoroallyl C=C double bond absorption at 1,800 cm$^{-1}$, indicating that the perfluorovinyl group is incorporated in the main chain of the copolymer, while the perfluoroallyl group remains as a pendant, side chain.

Example 2

2-Chlorotetrafluoroethyl trifluorovinyl ether (47 g) and 3,6-dioxa-5-trifluoromethylperfluoronona-1,8-diene (5 g) are emulsified with an aqueous mixture (300 ml) of ammonium perfluorooctanoate (1.66 g), ammonium persulfate (0.32 g), sodium dihydrogen phosphate (1.03 g), and disodium monohydrogen phosphate (1.25 g). After degassing under vacuum, tetrafluoroethylene is fed into the reaction mixture, and the pressure and temperature of the mixture are maintained at 100 psi and 60° C., respectively. After 40 g of tetrafluoroethylene are introduced over 2 hours, the reaction mixture is cooled to ambient temperature (23.5°–26° C.) and is discharged to atmospheric pressure. Diluted hydrochloric acid is added to the reaction mixture to coagulate the copolymer particles, which are collected by filtration. Washing with deionized water and drying under vacuum give 55 g of colorless copolymer particles. The infrared spectrum of the terpolymer exhibits the perfluoroallyl C=C stretching band at 1,795 cm$^{-1}$. The differential scanning calorimetry of the terpolymer shows neither exothermic nor endothermic activity from ambient temperature to 350° C., indicating that the terpolymer is amorphous.

EXAMPLE 3

2-Fluorosulfonyltetrafluoroethyl trifluorovinyl ether (22 g) and 3,6-dioxa-5-trifluoromethylperfluoronona-1,8-diene (2.3 g) are emulsified with a mixture of sodium dihydrogenphosphate (1.03 g), sodium monohydrogenphosphate (1.25 g), ammonium persulfate (0.32 g) and a FC-143 surfactant, ammonium perfluorooctanoate (1.66g), in deionized water (300 ml). The mixture is stirred at 55° C., and tetrafluoroethylene is charged thereto at a pressure of 100 psi. The reaction mixture is kept at this pressure until 19 g of tetrafluoroethylene is absorbed over 81 minutes. The reaction mixture is released to atmospheric pressure. Diluted hydrochloric acid (50 ml) is added to the reaction mixture to coagulate white fine powder, which is collected by centrifugation and is dried. Yield of the polymer is 35 g. Titration of the terpolymer gives the sulfonyl fluoride equivalent weight of 636 g/eq. The infrared spectra of the terpolymer exhibits the C=C stretching at 1,793 cm$^{-1}$, the SO$_2$F stretching at 1,467 cm$^{-1}$ and the CF$_2$—O at 1,107 cm$^{-1}$ before curing, while the C=C stretching absorption disappears on curing.

In several exemplary runs, the copolymer prepared in Example 2 is cured as follows:

EXAMPLE 4

A mixture of the terpolymer prepared in Example 2 (6 g), 1,6-diiodoperfluorohexane (0.5391 g), 2,5-dimethyl-2,5-di(tert-butylperoxy)hexane (0.3361 g), and calcium hydroxide (0.31 g) is slurried in 1,1,2-trichloro-1,2,2-trifluoroethane (150 ml). The mixture is evacuated using a rotary evaporator to strip the solvent. The dry powder obtained is placed in a mold (1.25×2.5 cm$^2$) and pressed at 175° F. The preform obtained therefrom is preheated at 350° F. for 2 minutes and is procured at the same temperature by pressing at a pressure of 5 tons for ]5 minutes. The procured preform is post-cured at 450° F. for 2 hours. Dynamic mechanical properties of the cured polymer are measured with a Rheometrics Mechanical Spectrometer Model 605 in the torsional rectangular mode from −175° C. to 330° C. The storage modulus, G', of the terpolymer shows a rubbery plateau extending from a glass transition temperature at 15° C. to 340° C., which indicates crosslinking. The cured copolymer is transparent and possesses a rubbery resilience.

EXAMPLE 5

The terpolymer prepared in Example 2 (6 g) and 2,5-dimethyl-2,5-di(tert-butylperoxy)hexane (0.3356 g) are added to 1,1,2-trichloro-1,2,2-trifluoroethane (150 ml). The mixture is evacuated using a rotary evaporator to give a colorless fine powder. The polymer mixture is added to a mold (1.25×2.5 cm$^2$) and is pressed at 175° F. The preform obtained thereby is preheated at 350° F. for 2 minutes and is procured at 350° F. by pressing at a pressure of 5 tons for 15 minutes. The procured preform is post-cured at 450° F. for 2 hours under nitrogen. The mechanical properties of the cured polymer are measured with a Rheometrics Mechanical Spectrometer Model 605 and show a rubbery plateau above a glass transition temperature at 15° C. to 300° C. in the storage modulus, which indicates crosslinking. The cured polymer is transparent and possesses a rubbery resilience.

Example 6

The terpolymer prepared in Example 2 (6 g) is ground in a ball mill and is placed in a mold (1.25×2.5 cm$^2$). The mold is covered with a metal plate. A preform is prepared by curing at 270° C. for 20 hours under nitrogen. The mechanical properties are measured with a Rheometries Mechanical Spectrometer Model 605. The storage modulus shows a rubbery plateau extending from a glass transition temperature at 15° C. to 350° C., which indicates crosslinking. The cured polymer is transparent and possesses a rubbery resilience. The cured polymer shows no perfluoroallyl C=C absorption in the infrared spectrum.

In another exemplary run, the copolymer of Example 3 is cured as follows:

EXAMPLE 7

The copolymer of Example 3 is cured and subjected to a hydration test as follows: Polymer powder is added to a circular disk (diameter of about 24 mm and thickness of about 2.4 mm) and is pressed at 0.5 ton and 210° C. The preform disk is cured under nitrogen at 270° C. for 20 hours. Each disk before or after curing is dried under vacuum at 100° C. for 24 hours, and is immersed in 25 percent NaOH with stirring at 60° C. for 3 days. The disk is washed with deionized water, kept in boiled deionized water for 2 hours, and dried under vacuum at 80° C. for 24 hours. A change of weight and 5 volume is measured before and after alkali hydration for the uncured and cured disks. The results of such testing are shown in Table I as follows:

TABLE I

|  | Uncured Disk | Cured Disk |
| --- | --- | --- |
| Weight before hydration, grams | 2.3693 | 2.2960 |
| Weight after hydration, grams | 4.1078 | 3.7020 |
| Percent change | +73.4 | +65.5 |
| Volume before hydration, cm$^3$ | 1.065 | 1.099 |
| Volume after hydration, cm$^3$ | 2.812 | 2.255 |

TABLE I-continued

|  | Uncured Disk | Cured Disk |
|---|---|---|
| Percent change | +164 | +105 |

The results of these examples and tests show the value of having two sites of unsaturation, such as both a vinyl and ally group, in ethylenically diunsaturated ethers which are used to prepare the polymers of this invention. When there is sufficient separation between the two double bonds in the molecule, such as the allyl and vinyl groups in a 3,6-dioxa-5-halodifluoromethyl-7-haloperfluoronona-1,8-diene or a corresponding multiple ether, their differing reactivity allows one unsaturated group to join in formation of the polymer while the other remains pendant in a side chain. The unsaturated side chain is thereafter free to participate in a dimerization reaction with such side chains on other polymer molecules, thereby crosslinking the polymer molecules. The benefits of crosslinking may be observed in Example 8 where the disk which has been cured, and thereby crosslinked, gains almost as much weight by water adsorption as the uncured disk, but does not gain nearly as much volume, which indicates that the cured polymer molecules are more resistant to change of shape because of the strength of the crosslinking bonds holding them together.

The polymers of this invention, when first manufactured, are not crosslinked, or are substantially uncrosslinked, which means they are still processible as a thermoplastic. As is shown in Example 8, however, there are often product enhancements, or other reasons, which make it desirable to crosslink the polymers of this invention. Crosslinking may be defined as the attachment of two chains of different polymer molecules by bridges composed of either an element, a group or a compound which join carbon atoms of the chains by primary chemical bonds. Crosslinking can be effected by thermal cure (e.g. heating at a temperature of 250°-350° C. for a period of 1 minute to 20 hours, and preferably a temperature of 270°-330° C. for a period of 5 minutes to 20 hours), exposure to high energy radiation, or a combination thereof with the activity of a crosslinking co-agent such as an organic peroxide, an azo compound, a diiodo compound, a diphenate salt, or, in general, a free radical generator. When a co-agent is used, crosslinking typically occurs at lower temperature, for example 150°-200° C. Crosslinking in a polymer may be shown by the presence of a rubbery plateau in the dynamic mechanical spectrum of the polymer.

Crosslinking typically results in polymer molecules which have increased strength and heat and solvent resistance, and creates what is known as a thermoset. It will therefore be seen that the polymers of this invention are characterized by an advantageous versatility which allows them to be fabricated as a thermoplastic at a temperature, for example, of less than 220° C., after which, because of the presence of pendant, unreacted double bonds, they can be cured to a thermost by crosslinking at a temperature, for example, of 250°-350° C. In one preferred embodiment for instance, one or more diunsaturated ethers, as described above, is copolymerized with one or more other ethylencially unsaturated monomers (as described above) carrying an ionic charge or a precursor group which can be converted to an ionically charged substituent, for example by hydrolysis with an aqueous alkaline solution. The copolymer thus prepared is fabricated into a membrane which, after being cured to crosslink the polymers, is well suited for use in an electrolytic cell, chlor-alkali cell or fuel cell.

A diunsaturated vinyl allyl ether may also be polymerized with other ethylenically unsaturated monomers as follows: Tetrafluoroethylene is fed into a mixture of perfluoroallylvinyl ether (17.6 g) and 2-perfluorovinyloxyethanesulfonyl fluoride (32.4 g) emulsified in water (300 ml), which mixture contains ammonium perfluorooctanoate (1.66 g), sodium dihydrogen phosphate (1.03 g), disodium monohydrogen phosphate to (1.25 g), and ammonium persulfate (0.25 g) under nitrogen. The pressure and temperature of the reaction mixture are kept at 175 psi and 60° C., respectively. After 64 g of tetrafluoroethylene are introduced, the reaction mixture is cooled to ambient temperature (23°-26.5° C.) and is discharged to atmospheric pressure. Diluted hydrochloric acid (50 ml) is added to coagulate the copolymer particles, which are collected by filtration. Washing with deionized water and drying under vacuum gives colorless copolymer particles. The copolymer is titrated with caustic to give an equivalent weight of 1,137. The copolymer is readily pressed at 280° C. to give a colorless clear film.

It is within the skill in the art to practice this invention in numerous modifications and variations in light of the above teachings It is, therefore, to be understood that changes may be made in the various described embodiments of this invention without departing from the spirit and scope of this invention as defined by the appended claims.

What is claimed is:

1. A linear homopolymer or copolymer having pendent unsaturated qroups, said homopolymer or copolymer comprising one or more of the ethers described by the formula $CF_2=CF-CF_2-Q-O-CF=CF_2$, where Q is $-G_a-(-O-C_2J_4-)_b-(-O-Z-)_c-$, in which G is a substantially fluorinated $C_3-C_7$ alkyl radical; a is 0 or 1; each J is independently fluorine, chlorine, bromine, or a $C_1-C_4$ substantially fluorinated alkyl radical on which not more than one substituent is chlorine, provided that not more than two J's are non-fluorine halogen atoms; b is 0-6 inclusive; Z is a substantially fluorinated $C_2-C_{10}$ alkyl radical; and c is 0 or 1; provided that sum of a+b+c is greater than 0.

2. The polymer of claim 1 wherein one or more of said ethers is an unbranched ether described by the formula $CF_2=CF-CF_2-O-(CF_2)_{m+2}-O-CF=CF_2$, where m is inclusively an integer of 0-8.

3. The polymer of claim 1 which is substantially uncrosslinked.

4. The polymer of claim 1 wherein at least one of said ethers is an ether of the formula

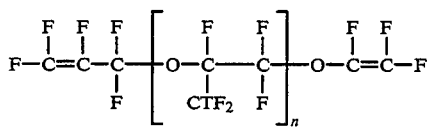

where T is a fluorine, chlorine, bromine or iodine atom, and n is an integer from 1 to 6 inclusive.

5. The polymer of claim 1 in the form of a fabricated article.

6. The polymer of claim 1 which is thermoplastic.

7. The polymer of claim 6 which has been thermally crosslinked through the pendent unsaturated groups after fabrication into an article.

8. The polymer of claim 7 which has been thermally crosslinked at 250°-350° C.

9. The polymer of claim 2 which has been thermally crosslinked through the pendent unsaturated groups after fabrication into an article.

10. A linear copolymer having pendent unsaturated groups, said copolymer comprising
    (a) one or more ethers described by the formula $CF_2=CF-CF_2-Q-O-CF=CF_2$, where Q is $-G_a-(-O-C_2J_4-)_b-(-O-Z-)_c-$, in which G is a substantially fluorinated $C_3-C_7$ alkyl radical; a is 0 or 1; each J is independently fluorine, chlorine, bromine, or a $C_1-C_4$ substantially fluorinated alkyl radical on which not more than one substituent is chlorine, provided that not more than two J's are non-fluorine halogen atoms; b is 0-6 inclusive; Z is a substantially fluorinated $C_2-C_{10}$ alkyl radical; and c is 0 or 1; provided that sum of a+b+c is greater than 0; and
    (b) one or more other ethylenically unsaturated monomers.

11. The copolymer of claim 10 wherein one or more of said ethers in component (a) is an unbranched ether described by the formula $CF_2=CF-CF_2-O-(CF_2)_{m+2}-O-CF=CF_2$, where m is inclusively an integer of 0-8.

12. The copolymer of claim 10 which is substantially uncrosslinked.

13. The copolymer of claim 10 wherein at least one of said ethers in component (a) is an ether as described in claim 4.

14. The copolymer of claim 10 wherein one or more of said ethylenically unsaturated monomers in component (6) is described by the formula $F-C(R)=C-R_2$, where each R is independently
    (a) hydrogen;
    (b) halogen;
    (c) $-OCH_3$;
    (d) $-OC_6F_5$;
    (e) $-C(CF_3)_2OH$;
    (f) $-R^1-NH-R^1-R_2$, where each $R^1$ is independently $SO_2$, CO or $PO_2$, and $R^2$ is a substantially fluorinated $C_1-C_{10}$ alkyl radical, optionally carrying at one or more sites an ionic charge or a precursor group which can be converted to an ionically charged substituent;
    (g) a $C_1-C_{10}$ linear or branched alkyl radical, interruptible with one or more oxygen atoms, each independently optionally containing one or more substituents selected from the group consisting of phenyl, $-F$, $-Cl$, $-Br$, $-I$, $-SO_2F$, $-OCH_3$, $-PO(OCH_3)_2$, $-COF$, $-CO_2H$, $-C(CF_3)_2OH$, $-CO_2CH_3$, $-CN$ and $-R^1-NH-R^1-R^2$, where $R^1$ and $R^2$ are as set forth above;
    (h) a phenyl or naphthyl radical, each independently optionally containing one or more substituents selected from the group consisting of $-F$, $-Cl$, $-Br$, $-I$, $-SO_2F$, $-OCH_3$, $-PO(OCH_3)_2$, $-COF$, $-CO_2H$, $-C(CF_3)_2OH$, $-CO_2CH_3$, $-CN$, $-R^1-NH-R^1-R^2$, where $R^1$ and $R^2$ are as set forth above, and a $C_1-C_6$; linear or branched alkyl radical; or
    (i) $O-R^3$, $S-R^3$ or $CO_2R^3$, where $R^3$ is a $C_1-C_{10}$ linear or branched alkyl radical, interruptible with either oxygen or keto groups, each independently optionally containing one or more substituents selected from the group consisting of phenyl, $-F$, $-Cl$, $-Br$, $-SO_2F$, $-OCH_3$, $-OC_6F_5$, $-PO(OCH_3)_2$, $-COF$, $-CO_2H$, $-CO_2CH_3$, $-CN$, $-C(CF_3)_2OH$, and $-R^1-NH-R^1-R^2$, where $R^1$ and $R^2$ are as set forth above.

15. The copolymer of claim 10 wherein one of said ethylenically unsaturated monomers in component (b) is tetrafluoroethylene.

16. The copolymer of claim 10 of which about 0.3 to about 25 mole percent is comprised of said ether or said ethers in component (a).

17. The copolymer of claim 10 of which about 0.5 to about 15 mole percent is comprised of said ether or said ethers in component (a).

18. The copolymer of claim 10 which is thermoplastic.

19. The copolymer of claim 18 which has been thermally crosslinked through the pendent unsaturated groups after fabrication into an article.

20. The copolymer of claim 19 which has been thermally crosslinked at 250°-350° C.

21. The copolymer of claim 10 wherein at least one of said ethylenically unsaturated monomers in component (b) carries an ionic charge or a precursor group which can be converted to an ionically charged substituent.

22. The copolymer of claim 21 wherein another of said ethylenically unsaturated monomers in component (b) is tetrafluoroethylene.

23. The copolymer of claim 21 or 22 which has been thermally crosslinked through the pendent unsaturated groups after fabrication into an membrane.

24. The copolymer of claim 23 which has been thermally crosslinked at 250°-350° C.

25. The copolymer of claim 21 or claim 22 in which the precursor group is converted to an ionically charged group.

26. The copolymer of claim 21 or 22 which has been hydrolyzed with an aqueous alkaline solution.

27. The copolymer of claim 25 wherein the precursor group has been converted to an ionically charged group with an aqueous alkaline solution.

28. The copolymer of claim 23 which has been hydrolyzed with an aqueous alkaline solution after crosslinking.

29. An electrolytic cell, chlor-alkali cell or fuel cell comprising a copolymer as described in claim 23.

30. A substantially uncrosslinked copolymer comprising perfluoroallylvinyl ether, tetrafluoroethylene and an ethylenically unsaturated monomer carrying an ionic charge or a precursor group which can be converted to an ionically charged substituent.

31. The copolymer of claim 30 wherein said ethylenically unsaturated monomer is 2-perfluorovinyloxyethanesulfonyl fluoride.

32. An electrolytic cell, chlor-alkali cell or fuel cell comprising a copolymer as described in claim 28.

33. The polymer of claim 1 wherein one or more of said ethers is described by the formula $CF_2=CF-CF_2-(CF_2)_p-O-CF=CF_2$, where p is an integer of 3 to 7 inclusive.

34. The copolymer of claim 10 wherein one or more of said ethers in component (a) is described by the formula $CF_2=CF-CF_2-(CF_2)_p-O-CF=CF_2$, where p is an integer of 3 to 7 inclusive.

35. The copolymer of claim 10 which is prepared by feeding 15 g of tetrafluoroethylene over 60 minutes into an emulsified mixture of 3,6-dioxa-5-trifluoromethylperfluoronona-1,8-diene (2.4 g), ammonium persulfate (0.16 g), ammonium perfluorooctanoate (1.66 g), sodium dihydrogen phosphate (1.03 g) and disodium monohydrogen phosphate (1.25 g) in deionized water (300 ml), with the pressure and temperature of the reaction mixture being kept at 100 psi and 60° C., respectively.

36. The copolymer of claim 10 which is prepared by feeding, after degassing under vacuum, 40 g of tetrafluoroethylene over 2 hours into an emulsified aqueous mixture (300 ml) of 2-chlorotetrafluoroethyl trifluorovinyl ether (47 g), 3,6-dioxa-5-trifluoromethylperfluoronona-1,8-diene (5 g), ammonium perfluorooctanoate (1.66 g), ammonium persulfate (0.32 g), sodium dihydrogen phosphate (1.03 g), and disodium monohydrogen phosphate (1.25 g), with the pressure and temperature of the mixture being maintained at 100 psi and 60° C., respectively.

* * * * *

UNITED STATES PATENT AND TRADEMARK OFFICE
CERTIFICATE OF CORRECTION

PATENT NO. : 5,393,852
DATED : Feb. 28, 1995
INVENTOR(S) : Nobuyuki Ishibe et al.

It is certified that error appears in the above-indentified patent and that said Letters Patent is hereby corrected as shown below:

In column 10, on line 35, "qroups", should read --groups--.

In column 11, on line 37, "(6)", should read --(b)--.

Signed and Sealed this

Twenty-sixth Day of March, 1996

Attest:

BRUCE LEHMAN

Attesting Officer

Commissioner of Patents and Trademarks